(12) United States Patent
Braun et al.

(10) Patent No.: US 10,557,553 B2
(45) Date of Patent: Feb. 11, 2020

(54) SEALING RING

(71) Applicant: KRONES AG, Neutraubling (DE)

(72) Inventors: Franz Braun, Neutraubling (DE);
Peter Schwarzfischer, Neutraubling (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 15/542,387

(22) PCT Filed: Jan. 8, 2016

(86) PCT No.: PCT/EP2016/050279
§ 371 (c)(1),
(2) Date: Jul. 7, 2017

(87) PCT Pub. No.: WO2016/110569
PCT Pub. Date: Jul. 14, 2016

(65) Prior Publication Data
US 2017/0370473 A1   Dec. 28, 2017

(30) Foreign Application Priority Data
Jan. 8, 2015   (DE) .................... 20 2015 100 048 U

(51) Int. Cl.
*F16J 15/3284* (2016.01)
*F16J 15/3268* (2016.01)

(52) U.S. Cl.
CPC ....... *F16J 15/3284* (2013.01); *F16J 15/3268* (2013.01)

(58) Field of Classification Search
CPC .. F16J 15/3284; F16J 15/3268; F16J 15/3276; F16J 15/46

USPC ......................................................... 277/560
See application file for complete search history.

(56) References Cited

U.S. PATENT DOCUMENTS

| | | | | |
|---|---|---|---|---|
| 2,549,818 A | | 4/1951 | Joy | |
| 2,793,889 A | * | 5/1957 | Potter, Jr. | F16F 9/364 |
| | | | | 277/529 |
| 4,415,166 A | | 11/1983 | Beia | |
| 4,526,385 A | * | 7/1985 | Wheeler | F16J 15/3208 |
| | | | | 277/556 |
| 4,614,444 A | * | 9/1986 | Hines | B62D 1/16 |
| | | | | 384/138 |
| 4,793,242 A | * | 12/1988 | Kobayashi | B60T 13/52 |
| | | | | 277/572 |

(Continued)

FOREIGN PATENT DOCUMENTS

| | | | | |
|---|---|---|---|---|
| EP | 0104504 A1 | * | 4/1984 | ............. F16J 15/164 |
| JP | 57004447 A | * | 1/1982 | ............. B60T 11/236 |
| JP | 10169781 A | * | 6/1998 | |

*Primary Examiner* — Eugene G Byrd
(74) *Attorney, Agent, or Firm* — Haynes and Boone, LLP

(57) ABSTRACT

A sealing ring for sealing a second component, which rotates in relation to a first component, for example for sealing a distribution channel of a rotary media distributor in a beverage filling system is described. The sealing ring includes an annular seal main body to be accommodated on the first component and a wear profiled element arranged radially within the seal main body for contacting the second component in a sealing manner, wherein the seal main body has at least one region of reduced radius in order to enable deformation of the seal main body as the seal main body is assembled with the first component.

20 Claims, 2 Drawing Sheets

(56) References Cited

U.S. PATENT DOCUMENTS

| | | | | |
|---|---|---|---|---|
| 4,953,876 | A | * | 9/1990 | Muller .................. F16J 15/164 |
| | | | | 277/556 |
| 5,192,137 | A | * | 3/1993 | Renard ................... B62D 1/16 |
| | | | | 384/192 |
| 7,918,462 | B1 | * | 4/2011 | MacGregor ........... F01D 11/025 |
| | | | | 277/413 |
| 8,047,008 | B2 | * | 11/2011 | Lebegue ................ F01D 9/023 |
| | | | | 60/752 |
| 9,556,905 | B2 | * | 1/2017 | Gibson, Jr. ............. F16C 33/20 |
| 2002/0153665 | A1 | * | 10/2002 | Borstel ................. F16J 15/164 |
| | | | | 277/560 |
| 2003/0122317 | A1 | * | 7/2003 | Andersson .......... B29C 45/1642 |
| | | | | 277/440 |
| 2004/0173976 | A1 | * | 9/2004 | Boggs .................... F16J 15/164 |
| | | | | 277/628 |
| 2005/0029749 | A1 | * | 2/2005 | Smith, III ............... F16L 33/16 |
| | | | | 277/602 |
| 2007/0013229 | A1 | | 1/2007 | Plantan et al. |
| 2007/0205563 | A1 | * | 9/2007 | Dietle .................. F16J 15/3236 |
| | | | | 277/551 |
| 2009/0200793 | A1 | * | 8/2009 | Smith, III ........... F16J 15/3268 |
| | | | | 285/111 |
| 2010/0156050 | A1 | * | 6/2010 | Heinrich ................ F16J 15/004 |
| | | | | 277/346 |

\* cited by examiner

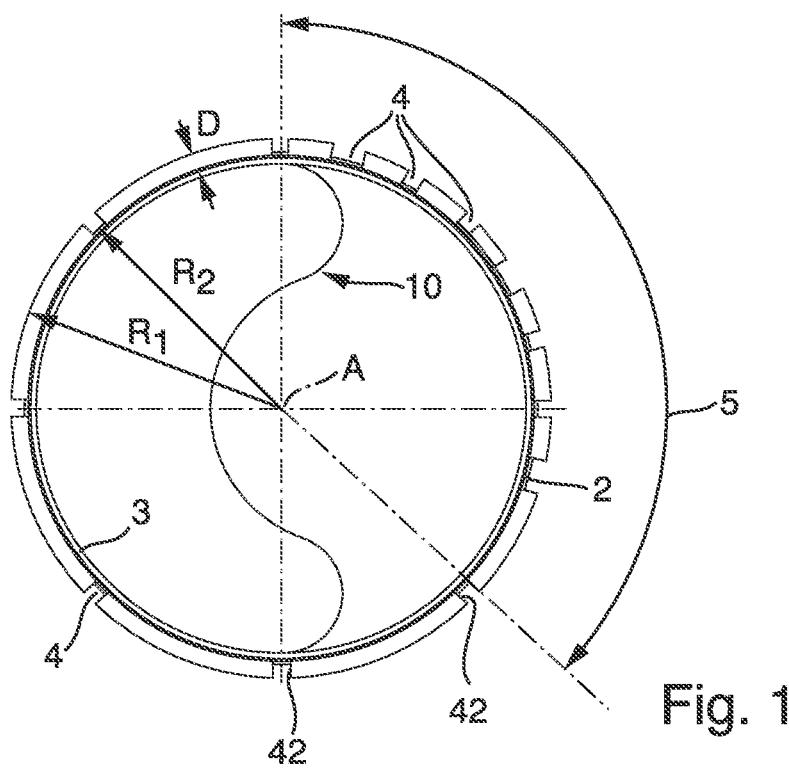
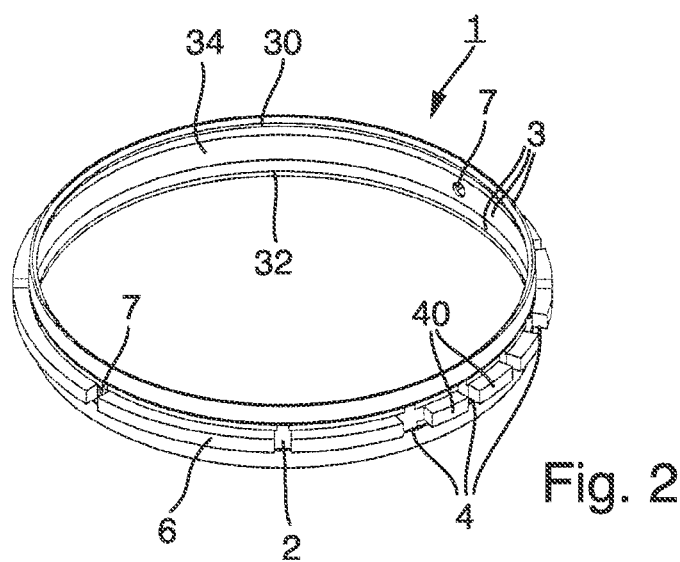

SEALING RING

CROSS REFERENCE TO RELATED APPLICATIONS

This application is a national stage of International Application No. PCT/EP2016/050279, filed Jan. 8, 2016, which claims priority from German Patent Application No. 20 2015 100 048.0 filed on Jan. 8, 2015 in the German Patent and Trademark Office, the disclosures of which are incorporated herein by reference in their entirety.

BACKGROUND

Technical Field

The present invention relates to a sealing ring for sealing a second component, which rotates in relation to a first component, for example, for sealing a distribution channel of a rotary media distributor in a beverage filling plant.

Related Art

With rotary machines in the field of beverage filling, for example with rotary fillers, rotary sterilizers or rotary rinsers, it is necessary to transfer fluid from stationary components of the plant, for example a machine frame, to components of the plant that rotate relative to the stationary components of the plant. This is for example achieved by means of a so-called rotary media distributor, which has on the machine frame a stationary shaft, upon which a rotating sleeve is provided. In order to form different distribution channels, rotating distribution channels are formed either in the shaft or in the sleeve, or in both, and are sealed relative to the environment and relative to the adjacent distribution channel by means of sealing rings.

Varying types of seals are known, for example seals in which a sealing element is pretensioned by means of an elastomer from a first component, for example a sleeve of a rotary media distributor, to a second component, for example a stationary shaft of the rotary media distributor. In this case it is preferable to provide both an elastomer component for creating the pretension and a wear profiled element disposed radially inside the elastomer, wherein the wear profiled element comes into sealing contact with the stationary shaft. Accordingly, the first component in the form of the rotating sleeve carries the seal with it, wherein the elastomer component, which creates the pretension, is accommodated in a housing groove in the sleeve. In order to insert the sealing ring, the housing groove is usually opened, in that a portion of the component that forms the housing groove is removed in an axial direction. The sealing ring is then inserted, after which the housing groove is again closed by joining the parts of the component that were previously separated from each other in an axial direction.

The wear profiled element, on the other hand, is in sealing contact with the stationary machine shaft, in order in this manner to provide a seal. The wear profiled element thus absorbs the relative movement between the sealing ring and the stationary machine shaft, with the result that wear occurs to the wear profiled element only. In order to keep the wear at this point as low as possible, it is known to manufacture the wear profiled element from a suitably wear-resistant and low-friction material, for example polytetrafluoroethylene (PTFE) or a PTFE compound.

It is known to accommodate the sealing ring in a housing groove in one of the components, for example in the sleeve of the rotary media distributor. In order to prevent the sealing ring from moving relative to the housing groove, and in this manner to avoid wear and abrasion of the seal main body, it is known to retain the sealing ring in the housing groove in a form-fit manner, and hence non-rotatably, for example by means of a pin or threaded connection which engages in a hole drilled in the sealing ring.

From DE 10 2012 110 752 A1, a device and a method for sealing a machine part relative to a second machine part is known, in which a sealing ring with a pretensioning element is shown.

From DE 103 16 147 B3, a seal for an oscillating motor is known, in which a sealing ring is accommodated in a housing groove.

SUMMARY

Proceeding from the known state of the art, the present disclosure describes a sealing ring for sealing a first component relative to a second component which rotates in relation to the first component.

Accordingly, a sealing ring for sealing a second component, which rotates in relation to a first component, for example for sealing a distribution channel of a rotary media distributor in a beverage filling plant, is proposed, comprising an annular seal main body to be accommodated on the first component and a wear profiled element arranged radially within the seal main body for contacting the second component in a sealing manner. The seal main body has at least one region of reduced radius in order to enable deformation of the seal main body as the seal main body is assembled with the first component.

The seal is particularly suitable for sealing a housing relative to a rotating shaft. In this case, for example a shaft of a rotary media distributor in a beverage filling plant can be sealed relative to the rotary media distributor sleeve. In a further embodiment, the passageway of the shaft of a rotary media distributor through an isolator housing in an aseptic beverage filling plant can also be sealed.

Due to the fact that the seal main body has at least one region of reduced radius in order to facilitate the deformation of the seal main body during assembly, it is also possible to insert the sealing ring in closed housing grooves, obviating the need to open the housing groove to enable this. This is particularly important when a multiplicity of such sealing rings are inserted in a rotary media distributor, since by this means the effort and expense required to exchange the sealing rings can be reduced, and one or a plurality of sealing rings can be installed in a housing, thereby making it possible to reduce the downtimes of a beverage filling plant.

By means of the provision of a region of reduced radius in the seal main body, it is possible to provide the sealing ring, and in particular the seal main body, with increased flexibility with respect to deformation in the plane defined by the sealing ring.

In some embodiments, the seal main body is provided with a plurality of regions of reduced radius, which are particularly provided in only one section or segment of the seal main body. In other words, the regions of reduced radius are disposed in only a portion of the seal main body—for example only in one half or one third of the circumference of the seal main body. Conversely, in the other regions or sections of the seal main body, a reduced number of regions of reduced radius, or none, are provided. Accordingly, the stability and integrity of the sealing ring can be maintained, and the contact pressure which is applied by the seal main body on the wear profiled element can reach a high level. At the same time, it is possible to achieve increased flexibility in the sealing ring only in the region in which a plurality of regions of reduced radius are provided, so that the sealing ring can be installed and replaced easily. For the purpose of installation or replacement, it is not necessary to open the housing groove by disassembling parts of the component that define the housing groove.

The regions of reduced radius are, in some embodiments, provided on the outside of the seal main body, i.e. in the region of the outer circumference of the seal body.

The term "radius" is understood here to mean the distance between the center of the sealing ring, which is defined by the axis of rotation of the sealing ring, and the outermost circumference of the sealing ring, i.e. the seal main body. In the regions of reduced radius, the outermost circumference is correspondingly displaced toward the center of the sealing ring relative to the adjacent regions.

The region of reduced radius can be formed in that the seal main body is designed to be narrower or thinner in the radial direction in this region. The material of the seal main body is accordingly less thick than in the adjacent regions.

In various embodiments, there are a greater number of regions of reduced radius to be arranged around the circumference of the seal main body in a deformation region than outside the deformation region. In this manner the structural integrity of the sealing ring can be maintained while the deformation characteristics are improved.

In certain embodiments, the seal main body has, at its circumference and oriented radially outwards, a web which is designed to be accommodated in a housing groove complementary to it in the applicable component. The term "web" is understood here to mean a portion of the seal main body that has a lesser extension or thickness in the axial direction of the sealing ring than those regions of the seal main body that are situated radially further inwards. By means of the web, it is possible to achieve a further improvement in the fixing of the sealing ring in the component, i.e. in the housing groove of the component, in particular in the axial direction. The seal main body accordingly has a web which protrudes radially outwards and substantially encircles the seal main body, wherein the regions of reduced radius are incorporated in the web. The sealing ring can thereby be particularly advantageously accommodated in a housing groove, in particular a closed housing groove.

The regions of reduced radius can be provided in the outwards-extending web only. In itself, a web significantly increases the stiffness against deformation of the sealing ring. By means of the web, the seal main body in effect acquires a T-shaped profile, which is particularly stiff against inward deformation. The incorporation of the regions of reduced radius, which can be provided for example in the form of recesses or cutout segments in the web, thus increases the flexibility of the seal main body, or the sealing ring as a whole, in order by this means to achieve simplified installation. The regions of reduced radius are thereby provided in only one segment or segmental section of the sealing ring, for example distributed over an angle of 180° or less. When a sealing ring is installed in a closed housing groove, the region that is not provided with regions of reduced radius is first inserted in the region of the closed housing groove that is intended for it, and the opposite region, which has an increased number of regions of reduced radius, is deformed towards the center of the sealing ring, in order that it too can be inserted in the applicable region of the closed housing groove.

The wear profiled element, in several embodiments has an upper profile region, a lower profile region and, between these, a central channel which, when the wear profiled element is in contact with the second component, is sealed in a fluid-tight manner by the upper profile region and the lower profile region. In particular, the central channel can be contacted via at least one rinsing and leakage aperture, which extends substantially radially through the wear profiled element and the seal main body. If no rinsing and leakage aperture is disposed in the wear profiled element, the supply to the central channel can alternatively take place through a shaft that is to be sealed relative to a housing. The leakage hole in the wear profiled element can be disposed in a region with reduced radius, or in a region without reduced radius.

In order to ensure a biunique orientation of the sealing ring in the mounting groove, the regions of reduced radius generally have differing extensions in a circumferential direction. Alternatively, or in addition, in order to achieve a biunique orientation the protruding elements between the regions of reduced radius can also have differing extensions in a circumferential direction.

In some embodiments, in the region of reduced radius, a securing element can also engage the first component, in order thereby to prevent rotation or displacement of the sealing ring within the housing groove. A positive fit can thus exist, in particular on the flanks or transitions from the regions of reduced radius to the regions in which the radius is not reduced.

The region of reduced radius accordingly offers the possibility of implementing an anti-rotation element, and of providing this without additional measures relating to the construction of the sealing ring. The region of reduced radius then has a double function, namely first the function by which the flexibility of the sealing ring is increased in order to facilitate installation, and secondly the function of providing or enabling protection against rotation.

An anti-rotation element is typically also provided in the closed housing groove of the component, for example in the form of a protruding element which has a complementary shape to the shape of the region of reduced radius. The protruding element thus fits into the region of reduced radius, such that protection against rotation can be achieved in this manner simply by the insertion of the sealing ring. The protruding element can be detachable from the sealing ring.

In an embodiment, such a protruding element is provided for each region of reduced radius, so that the sealing ring main body, when inserted in the housing groove, fully contacts and is supported by the housing groove in a radial direction. In this manner a highly reliable anti-rotation element can also be provided, which when under load does not result in an elongation of the material or an elastic displacement of the sealing ring. By this means the durability of the sealing ring can be improved.

A rotary media distributor with a fixed component and a component that rotates relative to the fixed component is further described, wherein on one component a closed housing groove for accommodating a sealing ring as described above is provided. The housing groove has a shape that is complementary to the shape of the seal main body. The complementary shape accordingly has elements protruding radially inwards in the positions in which the regions of reduced radius of the sealing ring are provided.

BRIEF DESCRIPTION OF THE FIGURES

Further embodiments of the invention are more fully explained by the description below of the figures.

FIG. 1 is a schematic plan view of a sealing ring in a first example embodiment;

FIG. 2 is a schematic perspective view of the sealing ring from FIG. 1;

DETAILED DESCRIPTION

Examples of embodiments are described below with the aid of the figures. In the figures, elements which are identical or similar, or have identical effects, are designated with identical reference signs. In order to avoid redundancy, repeated description of these elements is in part dispensed with in the description below.

Figure 3:
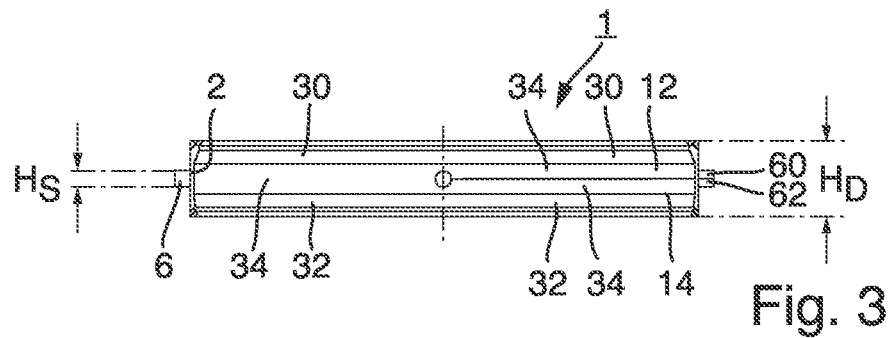
FIG. 3 is a schematic side elevation of the sealing ring from FIGS. 1 and 2.

FIGS. 1 to 3 show a schematic plan view, a schematic side elevation and a schematic perspective view of a sealing ring 1 in an example embodiment. The sealing ring 1 has an annular seal main body 2, and a wear profiled element 3 arranged radially within the seal main body 2. The seal main body 2 is designed to retain the wear profiled element 3 and apply a radial pretensioning force to the wear profiled element 3. The seal main body 2 is in several embodiments elastic, in order that it can apply the pretensioning force and in order to ensure that the sealing ring 1 is reliably held in tension between the components that are to be sealed relative to each other. Alternatively, and in some embodiments, the pretensioning force can also be applied and/or supplemented by additional pretensioning elements (not shown). In an advantageous further development, the seal main body 2 has a hose profile, by means of which a pretension can be actively influenced by charging the hose with a pretensioning fluid.

As can be seen in FIG. 2, which shows a schematic perspective view of the sealing ring 1, the wear profiled element 3 has an upper profile region 30 and a lower profile region 32, which form a central channel 34 between them when the wear profiled element 3 abuts a shaft or another rotationally symmetrical component accommodated in the sealing ring 1. The wear profiled element 3 is formed from a low-wear material, for example PTFE.

The sealing ring 1 serves to seal a first component, in which the sealing ring 1 with its seal main body 2 is accommodated, relative to a second component which is rotatably disposed in relation to the first component. For example the sealing ring 1 with its seal main body 2 can be accommodated in a housing groove of a rotating sleeve, and a stationary shaft of a rotary media distributor is accommodated in the sealing ring 1 such that the sealing ring 1 seals the stationary shaft relative to the rotating sleeve.

The sealing ring 1, and in particular the seal main body 2, has regions of reduced radius 4, which, in the example embodiment shown in FIGS. 1 to 3, are provided in the form of recesses or cutouts in the material around the circumference of the seal main body 2.

In FIG. 1, the radius of the sealing ring is shown as radius $R_1$. It extends from the center A, which is defined by the axis of rotation of the sealing ring 1, extending radially to the outermost part of the seal main body 2. A plurality of regions of reduced radius 4 with a radius $R_2$ are provided, which in each case cause a reduction of the thickness D of the sealing ring 1 in the radial direction, and which accordingly enable the sealing ring 1 to be flexible towards the center A of the sealing ring 1 in the plane defined by the sealing ring.

A deformed state of the sealing ring 1 is indicated schematically by reference sign 10. The region of the sealing ring 1 that is shown on the right hand side of FIG. 1 is pressed in towards the center A. In this manner it is possible to simplify the installation or assembly of the sealing ring 1 in a closed housing groove in the component that accommodates the sealing ring 1, since the section of the sealing ring 1 that is shown on the left hand side of FIG. 1 can first be inserted in the section of the closed housing groove that is provided for it, while at the same time the sealing ring 1 is deformed as shown by reference sign 10, in order that the sealing ring can then be fully inserted in the closed housing groove when the sealing ring has expanded back to its original shape as shown in FIG. 1.

The regions of reduced radius 4 thus serve to enable the sealing ring to be deformed simply and reliably, in at least one deformation region 5 that is provided, and thereby serve to facilitate installation of the sealing ring 1.

As can be seen particularly well from FIG. 2, the sealing ring 1 has on the seal main body 2 a circumferential web 6, whose outer circumference defines the radius $R_1$ of the sealing ring 1, and in which the regions of reduced radius 4 of the seal main body 2 are incorporated. Accordingly, by means of the regions of reduced radius 4, in the regions in which the radius of the web 6 is not reduced protruding elements 40 are provided, which have the structure of the original web 6, and which thus protrude radially in an outward direction.

In the regions of reduced radius 4, when the sealing ring 1 is installed in the component which accommodates it an anti-rotation element can be added which engages in the region of reduced radius. In this case the anti-rotation element can engage the flanks 42 that are formed by the transitions from the regions of reduced radius 4 to the regions with non-reduced radius.

The web 6 and the seal main body 2 are in several embodiments formed as a single piece and manufactured from the same material.

In the axial direction, i.e. in a direction perpendicular to the plane formed by the sealing ring 1, the web 6 has a lesser height $H_S$ than the sealing ring 1, which has a height $H_D$. The web is thus narrow, and can thereby be accommodated well in a suitably designed housing groove. Since, depending on the design, the remainder of the seal main body 2 has a greater thickness, either it is also disposed in a correspondingly shaped housing groove in the component, or else it abuts a wall of the component radially. In this manner the seal main body 2 forms a T-shaped profile, which is in itself highly resistant to deformation. The incorporation of the regions of reduced radius 4, however, restores the possibility of deformation, in order to facilitate the insertion of the sealing ring 1 in an installation groove.

In the region of the seal main body 2, which also comprises the web 6, a pretensioning element can be provided, for example in that the seal main body 2 and the web 6 are formed from an elastomer material with provides a suitable pretension. The seal main body 2 and/or the web 6 can however also be provided with an active pretensioning element, for example in the form of an inflatable hose, which can be charged with a suitable fluid and in this manner provide variable pretensioning.

The deformation region 5 typically extends over a maximum of one half of the angular range of the sealing ring 1, and is, as in the example embodiment shown in FIG. 1, provided over a smaller angular range, for example an angular range of 90° or 120°.

On its outer circumference, the sealing ring 1 generally has further regions of reduced radius 4, which are not situated in the deformation region 5 but in the remaining region. These regions of reduced radius 4 can also serve here as additional anti-rotation elements, or contribute to the deformability of these regions too, in order further to simplify the installation and deinstallation of the sealing ring 1.

Due to the fact that a deformation region 5 is provided which does not extend over the entire circumference of the sealing ring 1, but is only provided in a specified section, and in the other regions of the sealing ring 1 no regions of reduced radius 4, or only a smaller number of such regions, are provided, it can also be achieved that the sealing ring 1 has a biunique orientation in a housing groove in the housing that is designed to be complementary to it.

This is particularly important if, as shown for example in FIG. 2, in addition to the regions of reduced radius 4, the sealing ring 1 is also provided with rinsing and leakage apertures 7 passing through it, by means of which a central channel 34 between the upper profile region 30 and the lower profile region 32 can be brought into fluid contact. Accordingly, when the sealing ring 1 is in an installed state, the central channel 34 formed between the upper profile region 30 and the lower profile region 32 can be contacted via the rinsing and leakage apertures 7. This enables, firstly, cleaning to be performed, in that a flushing medium is passed through the central channel 34, in order for example to flush out abraded matter or residues of product that have penetrated in an unintended manner. Secondly, during production operation of a beverage filling plant, the sealing effect of the upper profile region 30 and the lower profile region 32 can be improved via the rinsing and leakage apertures 7, for example by the application of a vacuum, and possible leakage can be detected by monitoring the pressure. It is also possible to introduce a barrier medium such as steam or steam condensate through the rinsing and leakage apertures 7, for which purpose the rinsing and leakage apertures 7 can be connected with a source (not shown) of barrier medium.

In various embodiments, the regions of reduced radius 4 have a complementary counterpart in the applicable locating groove, such that in the region of reduced radius, a corresponding region of reduced groove radius in the installation groove is provided, which is designed to be complementary to the sealing ring 1, i.e. to the contour of the circumference of sealing ring 1. In other words, the regions of reduced radius 4 are engaged by complementary groove regions of the installation groove. By this means, it is firstly possible to provide the sealing ring 1 with a highly reliable anti-rotation element, which enhances the long-term durability of the sealing ring 1, since rotational movement of the sealing ring in the installation groove is greatly reduced, or can be prevented completely.

Furthermore, if a dedicated deformation region 5 exists, in a specified angular section of which a larger number of regions of reduced radius 4 are disposed in comparison with another section of the sealing ring 1 in which a lower number of regions of reduced radius 4, or none, are disposed, a lock and key situation can in effect be achieved, by which the sealing ring can be fully introduced into the applicable locating groove or installation groove in a unique orientation only. By this means, it is possible to establish contact with the rinsing and leakage aperture 7 in a simple and reliable manner.

In addition, due to the fact that the shape of the locating groove is complementary to the design of the seal main body 2 comprising the web 6 of the sealing ring 1, it can be achieved that the entire circumference of the sealing ring 1 is radially supported in the housing groove, such that the sealing effect is reliably achieved, since the pretension on the wear profiled element 3, which provides the sealing relative to the component accommodated in the sealing ring 1, is applied equally around the entire circumference of the sealing ring 1.

FIG. 3 shows two differing designs of a sealing ring 1, wherein on the left hand side of the figure the sealing ring 1 is designed as a single piece with the upper profile region 30, the lower profile region 32 and the central channel 34, and the web 6 is also provided in a single piece with the seal main body 2.

On the right hand side of FIG. 3, the overall geometry of the sealing ring 1 is the same, in that an upper sealing ring region 12 is provided, which comprises the upper profile region 30 and the first half of the central channel 34, along with an upper web region 60. A lower region 14 is further provided, which correspondingly comprises the lower profile region 32 and another portion of the central channel 34, along with a lower web region 62.

This solution has advantages in its manufacture, in that each profile of the sealing ring regions 12, 14 can be manufactured with substantially no undercut, and the tools for manufacturing the profiles can have a correspondingly simpler design.

It is thereby not essential for the upper sealing ring region 12 and the lower sealing ring region 14 of the sealing ring 1 to be bonded together or otherwise attached to each other. It is sufficient—depending on the tolerance of the locating groove—to insert the upper profile region 30 and the lower profile region 32 together in the closed housing groove, and in this manner, and also by means of the close fit between the upper web region 60 and the lower web region 62, to achieve reliable sealing of the central channel 34 relative to the outside.

Accordingly, a sealing ring 1 can be provided which in an advantageous manner can also be inserted in a closed housing groove, such as exists for example in the area of a sleeve of a rotary media distributor, without the sealing ring 1 being damaged during installation. This is achieved by the regions of reduced radius 4, which provide increased flexibility in the plane of the sealing ring 1. Due to the regions of reduced radius 4, it is further possible to provide protection against rotation in the housing groove, which is accomplished by providing either a pin or a structure in the housing groove that is complementary to the regions of reduced radius in the sealing ring 1.

In addition, if regions of reduced radius are provided in differing sequences around the circumference of the sealing ring 1, it can be achieved that the sealing ring 1 can be inserted in the applicable housing groove in a biunique orientation only, so that for example it can be ensured that a rinsing and leakage aperture 7 connects with the component without problems.

Figure 4:
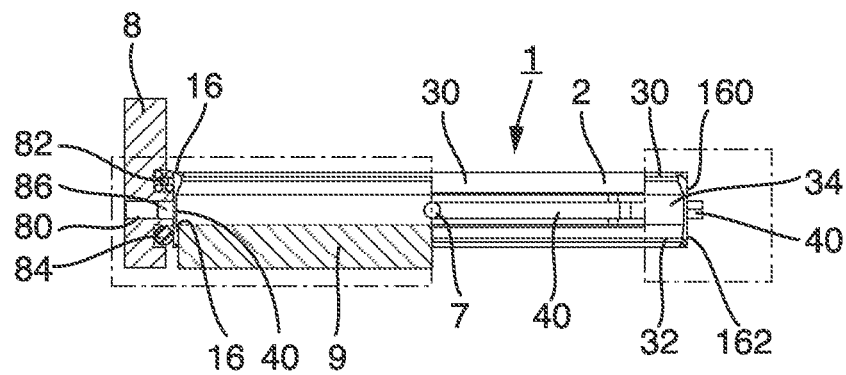
FIG. 4 is a schematic side elevation of a sealing ring installed in a housing.

In FIG. 4, the sealing ring 1 is shown in an installed state. The sealing ring 1 is accommodated in a housing 8, which has a groove region 80 in which the corresponding protruding elements 40 of the sealing ring 1 can be accommodated. The groove region 80 can be designed with a continuous depth, so that all protruding elements 40 can be accommodated in the groove region 80. In this case, the sealing ring 1 does not abut the material of the housing 8 in the regions of reduced radius 4, with the result that a cavity is created in each of these regions.

In certain embodiments, the groove region 80 is designed to be complementary to the shape of the sealing ring 1, and in particular complementary to the arrangement of the protruding elements 40. In other words, in the regions of reduced radius 4 of the sealing ring the groove region 80 has a lesser or zero groove depth, and in the positions of the protruding elements 40 of the sealing ring 1 it has at least a complementary groove depth. By this means an improved fit of the sealing ring 1 to the material of the housing 8 can be achieved.

In a particularly exact embodiment of the groove region 80 with such a complementary design, the sealing ring 1 can abut substantially the entire surface of the material of the housing 8 in the region of its protruding elements 40 and in the region of reduced radius 4. This results in effective protection against rotation for the sealing ring 1, since the flanks 42 of each the protruding elements 40 abut regions of the groove region 80 of the housing 8 that are complementary to them. In this manner it is also possible to achieve a biunique alignment of the sealing ring in the housing 8, if the protruding elements 40 have differing extensions in a circumferential direction. In effect, a "lock and key" design can thereby be achieved, by means of which each sealing ring 1 can be accommodated in a biunique position in the groove region 80 of the housing 8.

Furthermore, this design can also be used to carry out a coding of the seal type, by means of the protruding elements 40 extending in a circumferential direction over differing lengths, so that ultimately each groove region 80 of the housing 8 can only accommodate those sealing rings 1 that are suitable for it and coded accordingly.

The left hand side of FIG. 4 further shows by way of example the provision of an X-ring 82, which acts on the upper sealing ring region 12 and thereby pretensions it in a radial direction inwards. An inflatable O-ring 84 is also shown, which acts on the lower sealing ring region 14 and thereby pretensions it in a radial direction inwards. The sealing ring 1 can also be pretensioned radially with two O-rings 84 or two X-rings 82. The combination of an O-ring 84 and an X-ring 82 can also be used in reverse.

An anti-rotation element 86 in the form of a bolt or pin can also be provided, such that the anti-rotation element 86 is disposed between two flanks 42 of adjacent protruding elements 40, and thereby prevents rotation of the sealing ring 1 in the groove region 80.

The sealing ring 1 is provided on its outside in both the upper sealing region 12 and the lower sealing region 14 with a chamfer 16, which both facilitates the installation of the sealing ring 1 and improves its long-term durability, since the notch effect is reduced.

On the right hand side of FIG. 4, the shape of the sealing ring 1 is shown in the region of the chamfer 16, both in its as-manufactured geometry 160 and in its installed state 162.

In the sealing ring 1, a rotating shaft 9, which is sealed relative to the housing 8 by means of the sealing ring 1, is shown schematically.

The shaft 9 can be for example a shaft of a rotary media distributor in a beverage filling plant, and the housing 8 can be for example a sleeve of the rotary media distributor. By means of the sealing ring 1, it is possible for example for the individual distribution channels of the rotary media distributor to be sealed relative to one another.

The shaft 9 can also be a rotary shaft of a filler carousel disposed in an isolator for aseptic filling of beverages. The shaft 9 is then sealed by means of the sealing ring 1 relative to the housing 8 designed as an isolator.

To the extent applicable, all individual features described in the individual example embodiments can be combined with each other and/or exchanged, without departing from the field of the invention.

The invention claimed is:

1. A sealing ring configured to seal a second component that rotates in relation to a first component comprising:
   an annular seal main body configured to be accommodated on the first component; and
   a wear profiled element arranged radially within the annular seal main body and configured to contact the second component in a sealing manner,
wherein:
   the annular seal main body comprises a plurality of regions of reduced radius compared to radii of other regions of the annular seal main body,
   the plurality of regions of reduced radius are provided on an outer circumference of the annular seal main body,
   the annular seal main body is narrower in a radial direction in the plurality of regions of reduced radius compared to adjacent regions of the annular seal main body along a circumferential direction,
   the plurality of regions of reduced radius enable deformation of the annular seal main body as the annular seal main body is assembled with the first component, and
   a greater number of regions of reduced radius are arranged around the outer circumference of the annular seal main body in a deformation region than outside the deformation region, wherein at least one region of reduced radius from the plurality of regions of reduced radius is outside the deformation region.

2. The sealing ring of claim 1, further comprising protruding elements between the plurality of regions of reduced radius.

3. The sealing ring of claim 1, wherein the annular seal main body comprises a web that protrudes radially outwards and substantially encircles the annular seal main body.

4. The sealing ring of claim 3, wherein the plurality of regions of reduced radius are incorporated in the web.

5. The sealing ring of claim 1, wherein the wear profiled element comprises an upper profile region, a lower profile region, and a central channel between the upper profile region and the lower profile region.

6. The sealing ring of claim 5, wherein the central channel is sealed by the upper profile region and the lower profile region when the wear profiled element is in contact with the second component.

7. The sealing ring of claim 5, wherein the wear profiled element comprises at least one aperture that extends substantially radially through the wear profiled element and the annular seal main body.

8. The sealing ring of claim 7, wherein the at least one aperture is disposed in at least one region of reduced radius.

9. The sealing ring of claim 7, wherein the central channel is configured to be in fluid communication with the at least one aperture.

10. The sealing ring of claim 1, wherein the annular seal main body comprises an active pretensioning element that creates a pretension on the wear profiled element.

11. The sealing ring of claim 10, wherein the active pretensioning element comprises an inflatable hose.

12. A rotary media distributor comprising:
   a sealing ring, wherein the sealing ring comprises:
      an annular seal main body configured to be accommodated on a first component; and
      a wear profiled element arranged radially within the annular seal main body and configured to contact a second component to seal the second component that rotates in relation to the first component, wherein:

the annular seal main body comprises a plurality of regions of reduced radius compared to radii of other regions of the annular seal main body, the plurality of regions of reduced radius are provided on an outer circumference of the annular seal main body, the annular seal main body is narrower in a radial direction in the plurality of regions of reduced radius compared to adjacent regions of the annular seal main body along a circumferential direction, the plurality of regions of reduced radius enable deformation of the annular seal main body as the annular seal main body is assembled with the first component, and a greater number of regions of reduced radius are arranged around the outer circumference of the annular seal main body in a deformation region than outside the deformation region, wherein at least one region of reduced radius from the plurality of regions of reduced radius is outside the deformation region.

13. The rotary media distributor of claim 12, further comprising:

a fixed component; and a component that rotates relative to the fixed component, wherein a housing groove is disposed on the fixed component or the component that rotates, and the housing groove comprises a shape that is complementary to the shape of the annular seal main body.

14. A sealing ring configured to seal a second component that rotates in relation to a first component comprising:

an annular seal main body configured to be accommodated on the first component; and a wear profiled element arranged radially within the annular seal main body configured to contact the second component in a sealing manner, wherein:

the annular seal main body comprises a plurality of regions of reduced radius compared to radii of other regions of the annular seal main body, the plurality of regions of reduced radius are provided on an outer circumference of the annular seal main body, the annular seal main body is narrower in a radial direction in the plurality of regions of reduced radius compared to adjacent regions of the annular seal main body along a circumferential direction, the plurality of regions of reduced radius enable deformation of the annular seal main body as the annular seal main body is assembled with the first component, the plurality of regions of reduced radius are disposed in no more than half of a circumference of the annular seal main body, and a greater number of regions of reduced radius are arranged around the circumference of the annular seal main body in a deformation region than outside the deformation region, wherein at least one region of reduced radius from the plurality of regions of reduced radius is outside the deformation region.

15. The sealing ring of claim 14, wherein the deformation region extends no more than half of an angular range of the sealing ring.

16. The sealing ring of claim 14, wherein the annular seal main body comprises a web that protrudes radially outwards and substantially encircles the annular seal main body.

17. The sealing ring of claim 1, wherein the plurality of regions of reduced radius extends over an entire axial width of the annular seal main body.

18. The sealing ring of claim 14, further comprising protruding elements between the plurality of regions of reduced radius.

19. The sealing ring of claim 16, wherein the plurality of regions of reduced radius are incorporated in the web.

20. The sealing ring of claim 14, wherein the annular seal main body comprises an active pretensioning element that creates a pretension on the wear profiled element.

* * * * *